United States Patent [19]

Langan et al.

[11] Patent Number: 5,151,986
[45] Date of Patent: Sep. 29, 1992

[54] MICROCOMPUTER WITH ON-BOARD CHIP SELECTS AND PROGRAMMABLE BUS STRETCHING

[75] Inventors: John A. Langan, Austin; James M. Sibigtroth, Round Rock, both of Tex.

[73] Assignee: Motorola, Inc., Schaumburg, Ill.

[21] Appl. No.: 90,180

[22] Filed: Aug. 27, 1987

[51] Int. Cl.⁵ .............................................. G06F 1/04
[52] U.S. Cl. .............................. 395/550; 364/270.3; 364/271.6; 364/249.2; 364/259.9; 364/DIG. 1; 395/775
[58] Field of Search .................. 395/550, 775, 275; 364/200 MS File, 900 MS File

[56] References Cited

U.S. PATENT DOCUMENTS

| | | | |
|---|---|---|---|
| 3,656,123 | 4/1972 | Carnevale et al. | 364/200 |
| 4,030,075 | 6/1977 | Barlow | 364/200 |
| 4,040,021 | 8/1977 | Birchall | 364/200 |
| 4,050,096 | 9/1977 | Bennett | 364/200 |
| 4,153,941 | 5/1979 | Caddell | 364/900 |
| 4,241,418 | 12/1980 | Stanley | 364/900 |
| 4,354,227 | 10/1982 | Hays | 364/200 |
| 4,366,540 | 12/1982 | Berglund | 364/200 |
| 4,371,925 | 2/1983 | Carberry | 364/200 |
| 4,386,401 | 5/1983 | O'Brien | 364/200 |
| 4,458,308 | 7/1984 | Hotley | 364/200 |
| 4,458,308 | 7/1984 | Holtey et al. | 364/200 |
| 4,460,972 | 7/1984 | Homan | 364/900 |
| 4,460,972 | 7/1984 | Homan et al. | 364/900 |
| 4,482,983 | 11/1984 | Slechta, Jr. | 364/200 |
| 4,498,151 | 2/1985 | Henry | 364/900 |
| 4,499,536 | 2/1985 | Gemma et al. | 364/200 |
| 4,502,117 | 2/1985 | Kihara | 364/200 |
| 4,503,490 | 3/1985 | Thompson | 364/200 |
| 4,503,491 | 3/1985 | Lushtak | 364/200 |
| 4,507,732 | 3/1985 | Catiller | 395/275 |
| 4,535,404 | 8/1985 | Shenk | 364/200 |
| 4,535,404 | 8/1985 | Shenk | 364/200 |
| 4,611,279 | 9/1986 | Andreason | 364/200 |
| 4,611,279 | 9/1986 | Andresen et al. | 364/200 |
| 4,631,659 | 12/1986 | Hayn, II et al. | 364/200 |
| 4,636,656 | 1/1987 | Snowden | 364/900 |
| 4,636,656 | 1/1987 | Snowden et al. | 307/267 |
| 4,641,238 | 2/1987 | Kneib | 364/200 |
| 4,670,835 | 6/1987 | Kelly | 364/200 |
| 4,692,895 | 9/1987 | Huffmann | 364/900 |
| 4,722,070 | 1/1988 | Dye | 364/900 |
| 4,727,486 | 2/1988 | Smith | 364/200 |
| 4,733,294 | 3/1988 | Wesolowski | 360/36.2 |
| 4,764,865 | 8/1988 | Temple | 364/200 |
| 4,777,591 | 10/1988 | Chang | 364/200 |
| 4,819,164 | 4/1989 | Branson | 364/200 |
| 4,821,176 | 4/1989 | Ward | 364/200 |
| 4,881,194 | 11/1989 | Sprague | 364/900 |

OTHER PUBLICATIONS

Intel "Embedded Controller Handbook", 1987, pp. 17-1 thru 17-53.

*Primary Examiner*—Thomas C. Lee
*Assistant Examiner*—Eric Coleman
*Attorney, Agent, or Firm*—Jonathan P. Meyer

[57] ABSTRACT

A microcomputer with an external bus interface for providing communication with external peripheral devices such as memory and the like is provided with on-board chip select logic and programmable bus stretching capability. The chip select logic provides chip select signals to external devices when addresses fall within pre-selected ranges, eliminating the "glue" logic normally required for this purpose. The programmable bus stretching feature inserts a pre-selected number of "wait states" into any external bus cycle for which it is programmed by stretching, or freezing, the central processing unit and external bus interface unit clocks. Other internal clocks, such as those which drive timers and/or serial interface baud rate generators are not frozen by the bus stretch.

10 Claims, 3 Drawing Sheets

MICROCOMPUTER WITH ON-BOARD CHIP SELECTS AND PROGRAMMABLE BUS STRETCHING

FIELD OF THE INVENTION

The present invention relates, in general, to integrated circuit data processing devices. More particularly, the invention relates to a microcomputer with on-board chip selects and programmable bus stretching.

BACKGROUND OF THE INVENTION

Microcomputers are data processing devices which include a central processing unit (CPU), memory and some input/output (I/O) or other functions on a single piece, or chip, of semiconductor material. In many cases, such a microcomputer will include an external bus interface to provide communication with memory, I/O and other peripheral devices which are not located on the chip.

The timing requirements of integrated circuit data processors with external buses have long conflicted with the varying abilities of memory and other peripheral devices to respond to bus signals. Designers of computing systems have been forced to include circuits external to the data processor to modify, usually by "stretching" or inserting "wait states" into, the normal timing of a processor's buses in order to accommodate the abilities of the slower peripheral devices in their systems.

Most systems which include microcomputers also require off-chip logic to decode some of the upper address signals in order to trigger the enable, or select, inputs of the various peripheral devices. Bus stretching, chip select and any other required external functions are generally referred to as "glue logic". A possible design goal of a new microcomputer is to reduce required glue logic to as great an extent as possible.

However, integrating glue logic functions onto a microcomputer chip is not necessarily a trivial process. Retaining the flexibility which must be present in a microcomputer in order that it reach a sufficiently wide market requires that difficult trade-offs be made between competing customer needs. Integrating chip select and bus stretching logic onto a microcomputer requires careful consideration of trade-offs between, for example, reducing glue logic and reducing overall microcomputer performance.

SUMMARY OF THE INVENTION

Accordingly, it is an object of the present invention to provide a microcomputer with on-board chip select logic and programmable bus stretching.

It is a further object of the present invention to provide a microcomputer having on-board chip select logic and programmable bus stretching in which stretching of the external bus does not alter critical timing signals to other on-board devices.

These and other objects and advantages of the present invention are provided by a microcomputer comprising a central processing unit; clock logic means for providing a first timing signal to said central processing unit; another device which receives a second timing signal from said clock logic means; external bus interface means for providing communication between said central processing unit and devices external to the microcomputer, said external bus interface means provides a chip select signal when an address provided by said central processing unit falls within a pre-selected range of address values; and bus stretch means for selectably stretching a bus cycle and for freezing said first timing signal for a preselected period while said chip select signal is active without altering said second timing signal.

These and other objects and advantages of the present invention will be apparent from the detailed description below taken together with the drawings.

BRIEF DESCRIPTION OF THE DRAWINGS

FIG. is a block diagram illustrating a portion of the chip select and bus stretch logic of the microcomputer of FIG. 1.

DETAILED DESCRIPTION OF THE INVENTION

Figure 1:
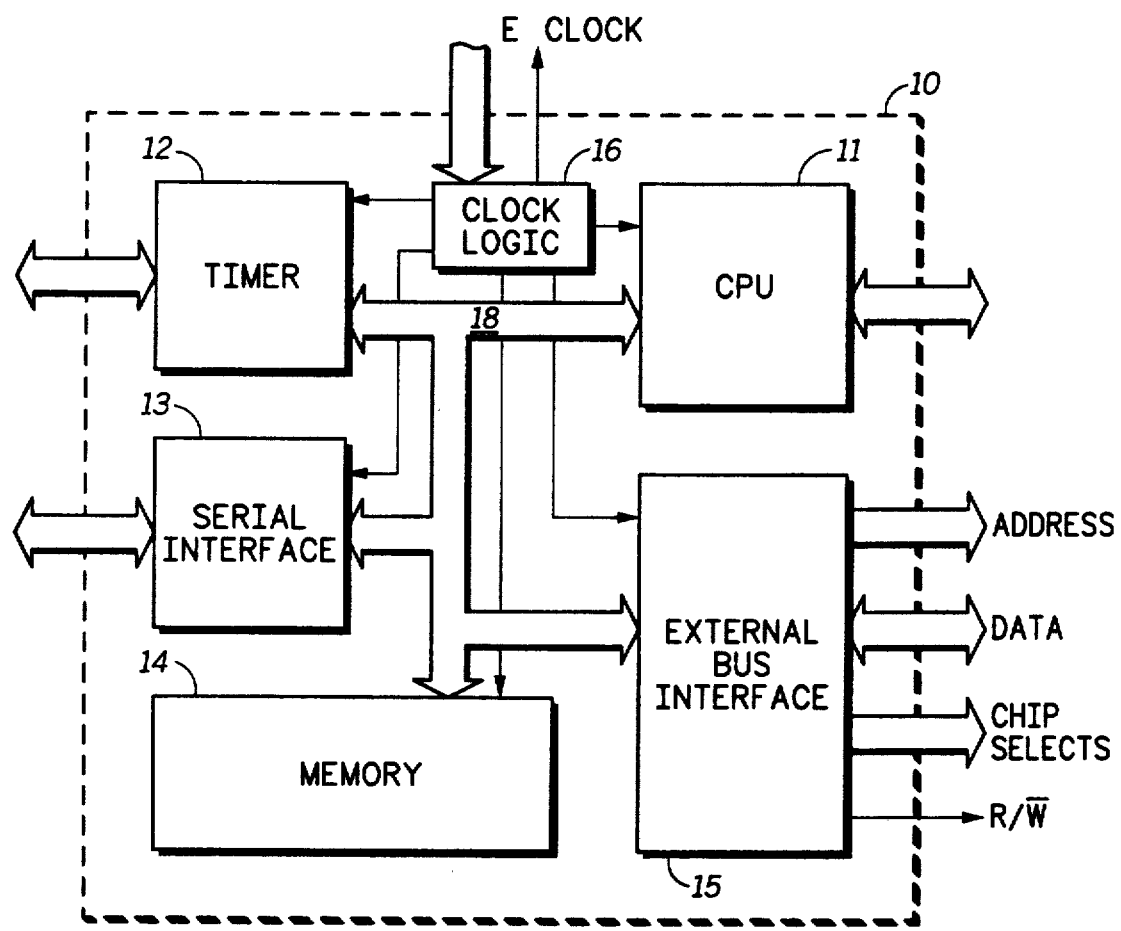
FIG. 1 is a block diagram illustrating a microcomputer according to the principles of the present invention.

FIG. 1 illustrates a microcomputer 10. Microcomputer 10 comprises a CPU 11, a timer unit 12, a serial communication interface 13, a memory unit 14, an external bus interface 15 and a clock logic unit 16. CPU 11 executes instructions and operates on data stored either in memory 14 or in external memory and communicates with timer 12, serial interface 13, memory 14 and external bus interface 15 by means of a set of internal buses 18. Internal buses 18 include address lines, data lines and control lines, as is familiar in the art.

Clock logic 16 receives signals, for instance, from an externally provided crystal oscillator, and generates the clock signals from which each of the other components of microcomputer 10 derive their timing signals. Clock logic 16 is, therefore, coupled to each of CPU 11, timer 12, serial interface 13, memory 14 and external bus interface 15. In addition, clock logic 16 provides a clock signal E (referred to hereinafter as the E-clock) in order that external devices may operate in appropriate timing relationship with microcomputer 10.

As illustrated, CPU 11, timer 12 and serial interface 13 are coupled to pins of microcomputer 10 to provide electrical connections to external devices. However, these connections are not necessary to an understanding of the present invention.

External bus interface 15 is also coupled to pins of microcomputer 10. As is familiar in the art, external bus interface 15 may "share" some pins with another on-board device such as a general purpose I/O port. This feature is not illustrated here to preserve clarity. External bus interface 15 provides the means by which CPU 11 communicates with externally provided memory and other peripheral devices which reside in its memory map. To that end, external bus interface 15 is coupled to a first group of pins which provide a plurality of address output signals, a second group of pins which provide a plurality of bidirectional data signals, a third group of pins which provide a plurality of chip select output signals and a single pin which provides a read/write output signal. Taken together, these pins comprise the external bus of microcomputer 10. The E-clock signal provided by clock logic 16 may also be thought of as a part of the external bus, since it provides the basis from which the timing specifications of the bus are defined and the means by which external devices may synchronize to the bus.

One skilled in the art will appreciate that the above-described external bus follows the conventions of products available from Motorola Microprocessor Products Group of Austin, Texas. However, the described embodiment is merely exemplary and is not intended to limit the scope of the present invention to the conventions of a particular manufacturer.

Figure 2:
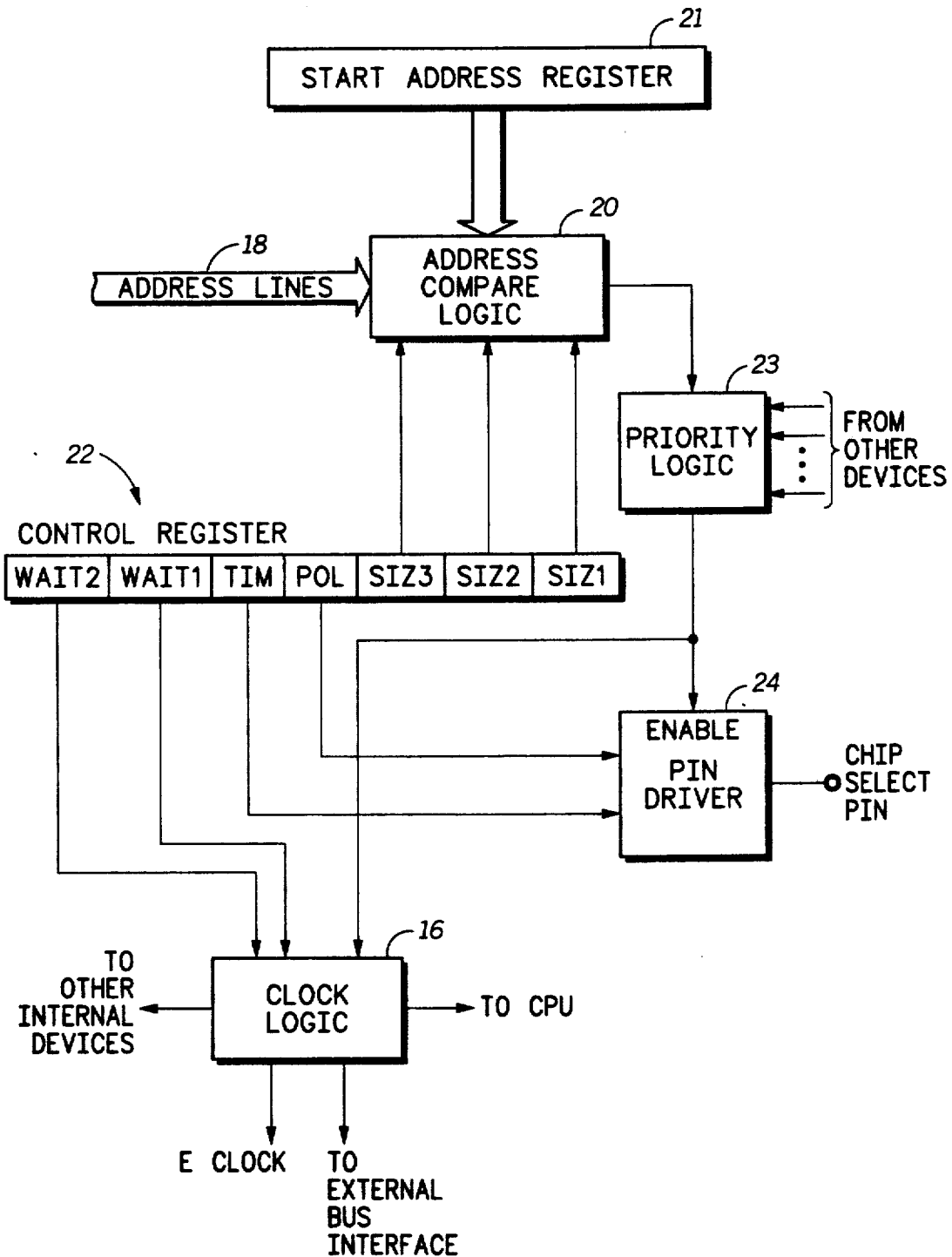

Referring now to FIG. 2, portions of microcomputer 10 of FIG. 1 are illustrated in greater detail. Address compare logic 20 receives inputs from at least some of the address lines of internal buses 18 (see FIG. 1) and from a start address register 21. In addition, address compare logic 20 receives inputs from three bits, labelled SIZ1-SIZ3, of a control register 22. An output of address compare logic 20 is coupled to an input of priority logic 23. An output of priority logic 23 is coupled to an enable input of a pin driver 24.

Pin driver 24 also has inputs coupled to two bits, labelled POL and TIM, of control register 22. An output of pin driver 24 is coupled to a chip select pin which comprises one of the chip select outputs of external bus interface 15 of microcomputer 10.

Clock logic 16 has inputs coupled to an output of priority logic 23 and to two bits, labelled WAIT1 and WAIT2 of control register 22. Clock logic 16 has outputs which supply clock signals to CPU 11, external bus interface 15, to the E-clock pin of microcomputer 10 and to all other on-board devices such as timer 12, serial interface 13 and memory 14.

In operation, user-supplied software may store appropriate data values in start address register 21 and control register 22 in order to operate the chip select and bus stretch logic in the desired fashion. The start address register contains the lower bound of the address range for which the user wishes the chip select signal to be active. The SIZ1-SIZ3 bits of control register 22 contain information from which the desired size of the address range for which the chip select signal is to be active. Using three bits, a selection between eight available sizes may be encoded. In the preferred embodiment, one of the available sizes is zero, which provides a means for disabling the chip select and bus stretch logic without the need of a separate enable control bit.

Whenever the address being accessed by CPU 11 falls within the range defined by the start address register and the SIZ control bits, address compare logic 20 produces an enable signal, which is provided to an input of priority logic 23. Priority logic 23 serves to avoid conflicts between several devices which, because of the values stored by user-supplied software in registers 21 and 22, would otherwise be located at overlapping sites within the memory map. In other words, if the control, status and data registers of timer 12 appear in the memory map of CPU 11 at addresses $E000-$E004 (addresses are given in hexadecimal), if the value $E000 has been stored in start address register 21 and if the SIZ control bits specify a size of 1K bytes, then there is a potential conflict between the off-chip device to which the chip select signal is coupled and timer 12. Priority logic 23 receives inputs from the address decoding circuits for each of the devices with which there is a potential conflict and allows the enable signal from address compare logic 20 to pass only if there is no actual conflict.

In the preferred embodiment, any on-board device has priority over any off-chip device and a predetermined scheme exists for assigning priority between off-chip devices.

If no other, higher priority device preempts it from doing so, priority logic 23 passes the enable signal from address compare logic 20 to an enable input of pin driver 24. Pin driver 24 responds to its enable input by driving an active chip select signal out via the chip select pin. The timing and polarity of the chip select signal are determined according to the TIM and POL bits, respectively, of control register 22.

Any logic signal may be either active high or active low. By common usage, chip select signals are most often active low. However, to provide as much flexibility as possible, it may be advantageous to provide at least one chip select signal which may be selected to be active high. The POL bit allows the user to select the active state of the chip select signal. Similarly, chip select signals are sometimes active, or valid, during a particular phase of the E-clock signal (or similar signal in other bus systems), or may be valid as long as the address signals are valid. The TIM bit allows the user to chose between, in the preferred embodiment, whether the chip select signal will be active simultaneously with the high phase of the E-clock (referred to as E-valid) or simultaneously with the presence of a valid address (address-valid).

In addition to being coupled to the enable input of pin driver 24, the output of priority logic 23 is coupled to an input of clock logic 16. Thus, whenever pin driver 24 is enabled to drive a chip select signal active, clock logic 16 is enabled to execute a bus stretch operation, if programmed to do so by the WAIT bits of control register 22.

Using two bits from control register 22, as shown here, one can program four different bus stretch periods. In the preferred embodiment, the data value stored in WAIT1 and WAIT2 may represent the digital values 0,1,2 or 3. This is interpreted by clock logic 16 as a number of extra E-clock cycles, or wait states, to be inserted into the current bus cycle. Of course, with other common microcomputer buses, the details of the encoding and implementation of the bus stretch bits may be slightly different.

Figure 3A:
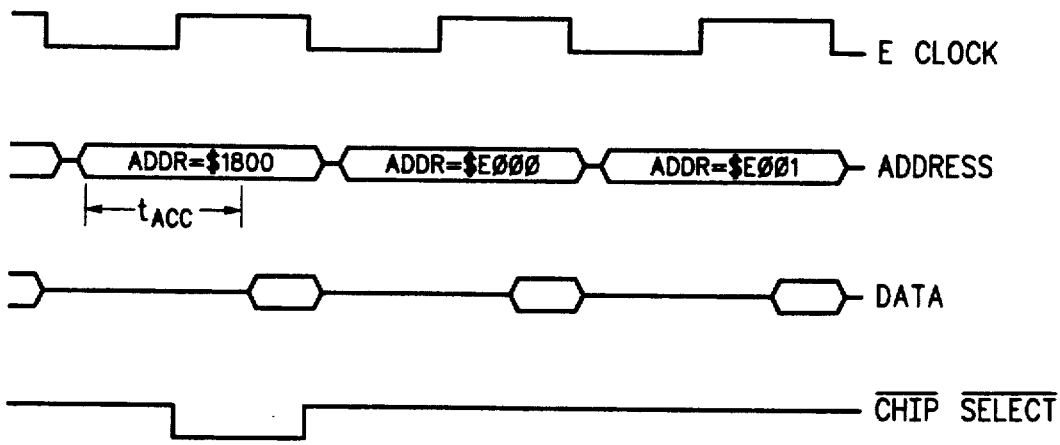
FIGS. 3A-3B are timing diagrams illustrating the operation of the apparatus of FIGS. 1 and 2.
Figure 3B:
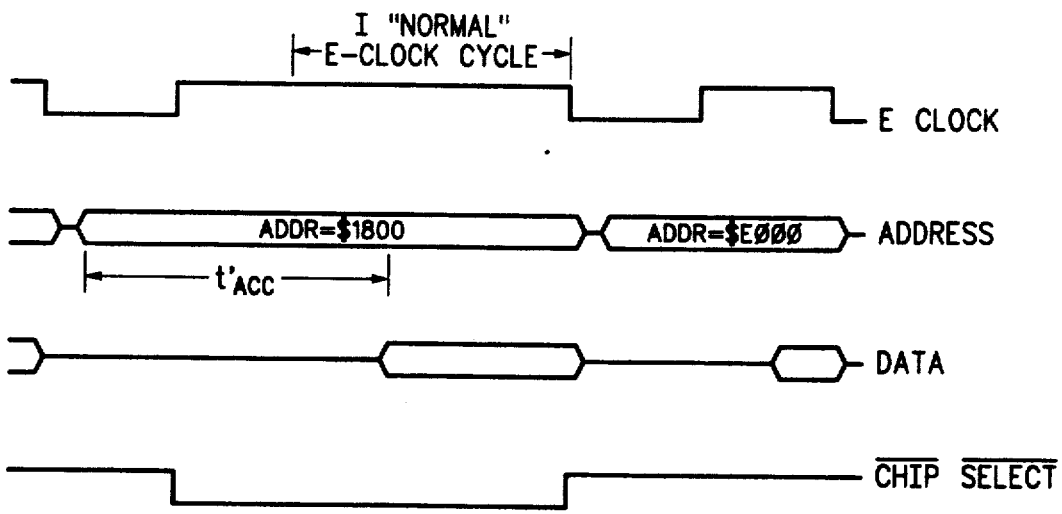

As is described more fully with reference to FIGS. 3A and 3B, clock logic 16 responds to the input from priority logic 23 and the value of the WAIT bits by modifying some, but not all, of the clock signals it provides to the various internal and external devices. The E-clock signal is frozen, effectively stretching time for external devices. In addition, the clock signal supplied to CPU 11 is frozen, since it must wait for the bus cycle to properly terminate before continuing. The clock supplied to external bus interface 15 is also frozen, so that the address and read/write line drivers remain frozen.

However, the clock signals supplied by clock logic 16 to timer 12 and serial interface 13 (and to any other on-board devices which might need a steady clock signal) are not frozen. This provides, for instance, that free-running counters in timer 12 which are used to generate real-time signals are not rendered inaccurate by the use of stretched bus cycles. Similarly, baud rate generators in serial interface 13 which rely on the system clock as a time base are not interfered with. Similar benefits are available to other devices which may be integrated on the microcomputer chip.

Referring now to FIG. 3A the unaltered external bus timing of the microcomputer of FIG. 1 is illustrated.

The uppermost trace of FIG. 3A represents the E-clock signal produced by clock logic 16. The E-clock signal is, roughly, a square wave of a predetermined period. For instance, if the basic bus speed of the microcomputer is 2 MHz, the period of the E-clock signal will be approximately 500 nanoseconds.

The next trace of FIG. 3A represents the presence and absence of valid signals on the external address bus. Normally, address information changes shortly after a falling edge of the E-clock and remains valid until after the next falling edge of the E-clock. An external device must respond to the valid address by (in the case of a read cycle) placing data on the data bus no later than a predetermined time, $t_{ACC}$, after the address becomes valid, as shown by the next trace of FIG. 3A. As shown, $t_{ACC}$ is less than one E-clock period, which may be substantially less than the minimum access time for some slow memories, for instance.

The last trace of FIG. 3A illustrates the activity of a programmed chip select signal. In this case, assume that the start address for this particular chip select signal has been set at $1800 and that the size has been set to 2K bytes. Further assume that the timing of the signal has been set to E-valid and that the signal has been programmed to active low. Thus, shortly after the address $1800 is placed on the address lines, the chip select signal becomes active (goes low), thus enabling the peripheral to respond to the address. As illustrated, the next two bus cycles, which access addresses $E000 and $E001, respectively, do not trigger the activation of the chip select signal, since they fall outside of the programmed address range.

Obviously, in the case illustrated in FIG. 3A, the programmed number of wait states, or bus stretch cycles, is zero. FIG. 3B illustrates the use of the programmable bus stretch feature to accommodate a peripheral device which has a minimum access time, $t'_{ACC}$, which is longer than $t_{ACC}$. The programming of the chip select logic for this device is the same as that described above, except that a bus stretch of 1 E-clock cycle has been programmed. As illustrated, both the address and chip select signals become valid at their respective normal times with respect to the E-clock, but they each remain valid for an additional period equal to one "normal" E-clock period, as does the E-clock signal itself. In this case, the slow peripheral is allowed its necessary access time. Meanwhile, as pointed out above, any timers, serial interfaces and other on-board, system clock-dependent devices remain accurate, since their clock signals are not interrupted.

While the description above involves a very flexible and powerful programmable chip select and bus stretch implementation, certain modifications and changes may be made to accommodate particular situations. For instance, in a preferred embodiment of the present invention, a microcomputer has four chip select pins. One, referred to as the general purpose chip select, is substantially as described above.

Another, referred to as the program chip select, does not have the same flexibility as to location as does the general purpose chip select. Its size is determined by a two-bit control register field to be one of 64K, 32K, 16K or 8K bytes and its upper bound is always $FFFF. Its polarity is always active low and it is always address valid. A one-bit control field acts to enable or disable this chip select and bus stretch mechanism, since no zero-size option is available. Also, a one-bit control field determines whether the program or the general purpose chip select has a higher priority. The program chip select has the same programmable bus stretches as does the general purpose chip select.

The program chip select is optimized for selecting an external memory device or devices which contain user-supplied programs. The program chip select requires only 6 bits of control information as opposed to 13 for the general purpose chip select.

The other two chip selects, referred to as the register selects, also have less flexible location and size. The location of the register selects is determined by the location of the register space of the microcomputer, which is mappable to any 4K boundary within the memory map. The register selects and the register space occupy a total of 4K of memory space. The first register select has a size of 2K and the other is 2K minus the size of the register space. Each register select has one enable bit, one polarity bit and a two-bit bus stretch field. The timing is always E-valid. The register selects have higher priority than the other selects, but lower than internal devices. The register selects require a total of 6 bits of control information.

The modifications described above are just a few of the many possible modifications to the principles of the present invention. Many possible combinations of chip select location within the memory map, address range size, timing and polarity and programmable bus stretching will be apparent to one skilled in the art from the description of the preferred embodiment.

We claim:

1. A microcomputer comprising:
   central processing unit means for executing instructions, operating on data and interacting with peripheral devices;
   internal address and data buses internal to said microcomputer and coupled to said central processing unit means;
   a peripheral device;
   external bus interface means coupled to said internal address and data buses for coupling external peripheral devices external to said microcomputer to said internal address and data buses, said external bus interface means further comprising:
   (1) first programmable chip select means for providing a first chip select output signal if an address provided by said central processing unit means is within a first address range which has been selected by said central processing unit means; and
   (2) programmable bus cycle stretch means for asserting a first control signal if an address provided by said central processing unit means is within said first address range and if said central processing unit has programmed said programmable bus cycle stretch means to be active concurrent with said first chip select output signal; and
   clock logic means for providing timing signals to said central processing unit means, said peripheral device, said external bus interface means and to said external peripheral devices, said clock logic means being responsive to a first control signal to freeze said timing signals provided to said central processing unit, said external bus interface means and said external peripheral devices and to leave said timing signal provided to said peripheral device unaffected.

2. A microcomputer according to claim 1 further comprising:
   an address decoding circuit coupled to the internal address bus and to the peripheral device; and
   priority logic coupled to an output of the address decoding circuit, to the first programmable chip select means and to the programmable bus cycle stretch means.

3. A microcomputer according to claim 1 wherein said external bus interface means further comprises:
   first chip select control register means for storing, at the command of the central processing unit means, a plurality of bits of control information, a first portion of said control information specifies said first address range and a second portion of said control information specifies whether said bus cycle stretch means is programmed to be active concurrent with said first chip select output signal.

4. A microcomputer according to claim 3 wherein said second portion of said control information stored in said first chip select control register means also specifies a length of time during which said clock logic means will freeze said timing signals.

5. A microcomputer according to claim 1 wherein said external bus interface further comprises:
   second programmable chip, select means for providing a second chip select output signal if an address provided by said central processing unit means is within a second address range which has been selected by said central processing unit means; and
   said said programmable bus cycle stretch means is also for asserting said first control signal if an address provided by said central processing unit means is within said second address range and if said central processing unit has programmed said programmable bus cycle stretch means to be active concurrent with said second chip select output signal.

6. A microcomputer according to claim 5 wherein said external bus interface means further comprises:
   second chip select control register means for storing, at the command of the central processing unit means, a plurality of bits of control information, a first portion of said control information specifies said second address range and a second portion of said control information specifies whether said bus cycle stretch means is programmed to be active concurrent with said second chip select output signal.

7. A microcomputer according to claim 6 wherein said second portion of said control information stored in said second chip select control register means also specifies a length of time during which said clock logic means will freeze said timing signals.

8. An integrated circuit microcomputer comprising:
   a central processing unit;
   address and data buses internal to the integrated circuit microcomputer and coupled to the central processing unit;
   a peripheral device coupled to the internal address and data buses;
   an external bus interface coupled to the internal address and data buses and adapted to be coupled to a plurality of signals lines external to the integrated circuit microcomputer comprising external address and data buses, the external bus interface further comprising:
      first register means coupled to the internal address and data buses;
      address compare logic having inputs coupled to the first register means and to the internal address bus and an output; and
      pin driver logic having an enable input coupled to the output of the address compare logic and having an output coupled to a pin of the integrated circuit microcomputer; and
   clock logic having an input coupled to the output of the address compare logic having a first output coupled to the central processing unit and a second output coupled to the peripheral device;
   wherein the improvement comprises:
   the clock logic is responsive to the output of the address compare logic to freeze a clock signal provided to the central processing unit and to leave a clock signal provided to the peripheral device unaffected.

9. An integrated circuit microcomputer according to claim 8 wherein the improvement further comprises:
   second register means coupled to the internal address and data buses; and
   the clock logic means is responsive a value contained in the second register means to determine a length of time during which the clock signal provided to the central processing unit is frozen.

10. An integrated circuit microcomputer according to claim 8 wherein the improvement further comprises:
    an address decoding circuit coupled to the internal address bus and to the peripheral device; and
    priority logic coupled to an output of the address decoding circuit, to the pin driver logic and to the clock logic.

* * * * *

UNITED STATES PATENT AND TRADEMARK OFFICE
CERTIFICATE OF CORRECTION

PATENT NO. : 5,151,986

DATED : September 29, 1992

INVENTOR(S) : John A. Langan, et al

It is certified that error appears in the above-indentified patent and that said Letters Patent is hereby corrected as shown below:

On the title page, item [54] and column 1, line 3, after "BUS" insert —CYCLE—

Column 7, line 31, after "said" delete [said]

Signed and Sealed this

Thirteenth Day of September, 1994

Attest:

BRUCE LEHMAN

Attesting Officer

Commissioner of Patents and Trademarks